US 7,827,134 B2

(12) United States Patent
Prang et al.

(10) Patent No.: US 7,827,134 B2
(45) Date of Patent: Nov. 2, 2010

(54) SYSTEM AND METHOD FOR TRANSFERRING DATA AND METADATA BETWEEN RELATIONAL DATABASES

(75) Inventors: Bruce A. Prang, Woodinville, WA (US); Ciprian Gerea, Seattle, WA (US); Dmitry Sonkin, Redmond, WA (US); James Kirk Haselden, Sammamish, WA (US); Jeffrey R. Bernhardt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 90 days.

(21) Appl. No.: 11/030,534

(22) Filed: Jan. 5, 2005

(65) Prior Publication Data

US 2006/0149706 A1 Jul. 6, 2006

(51) Int. Cl.
*G06F 7/00* (2006.01)
*G06F 17/00* (2006.01)
(52) U.S. Cl. ..................................... 707/602
(58) Field of Classification Search .................... None
See application file for complete search history.

(56) References Cited

U.S. PATENT DOCUMENTS 7,139,779 B1 * 11/2006 Kornelson et al. .......... 707/203
2001/0047372 A1 * 11/2001 Gorelik et al. .............. 707/514
2003/0023580 A1 * 1/2003 Braud et al. .................... 707/3
2003/0177481 A1 * 9/2003 Amaru et al. ............... 717/148
2003/0217069 A1 * 11/2003 Fagin et al. ................. 707/102
2004/0225677 A1 * 11/2004 Rangadass .................. 707/102
2005/0055351 A1 * 3/2005 Barton et al. ................ 707/10
2005/0138003 A1 * 6/2005 Glover et al. .................. 707/3
2005/0289125 A1 * 12/2005 Liu et al. ........................ 707/3
2005/0289138 A1 * 12/2005 Cheng et al. ................... 707/5
2006/0004866 A1 * 1/2006 Lawrence et al. ........ 707/104.1

* cited by examiner

*Primary Examiner*—Neveen Abel Jalil
*Assistant Examiner*—Raheem Hoffler
(74) *Attorney, Agent, or Firm*—Woodcock Washburn LLP

(57) ABSTRACT

A script driven infrastructure is provided in order to selectively move structure and data from a source database to a target database. The structure and data is moved using a data transfer mechanism, where the data is contained in disk files stored on the source database and it has corresponding script files describing the structure of the data. The transfer of the data is driven by the script files which allows for selective transfer of structure and data. In one aspect of the invention, the disk files are stored in SQL format and the script files are saved in SQL format and XML format, where the script files saved in SQL format create objects and relational constraints in the target database, and the script files stored in XML format drive the transfer process of the data stored in the disk files.

19 Claims, 7 Drawing Sheets

Detailed View of DTS 200b

DTS Execution Sequence 300

Exemplary Interface Implementations 500

501
| <<interface>> |
| :---: |
| IDataTransferProvider |
| + Configure (in metadataProvider : ITransferMetadataProvider) : void<br>+ ExecuteTransfer() : void |

502
| <<interface>> |
| :---: |
| ITransferMetadataProvider |
| + SaveMetadata() : void<br>+ GetOptions() : <unspecified> |

508

504
| MetadataTransferProvider |
| :---: |
| + TransferData() : void<br>+ SaveMetadata()<br>+ GetOptions() |

506
| DtsTransferProvider |
| :---: |
| + Configure()<br>+ ExecuteTransfer()<br>+ GetPackage() |

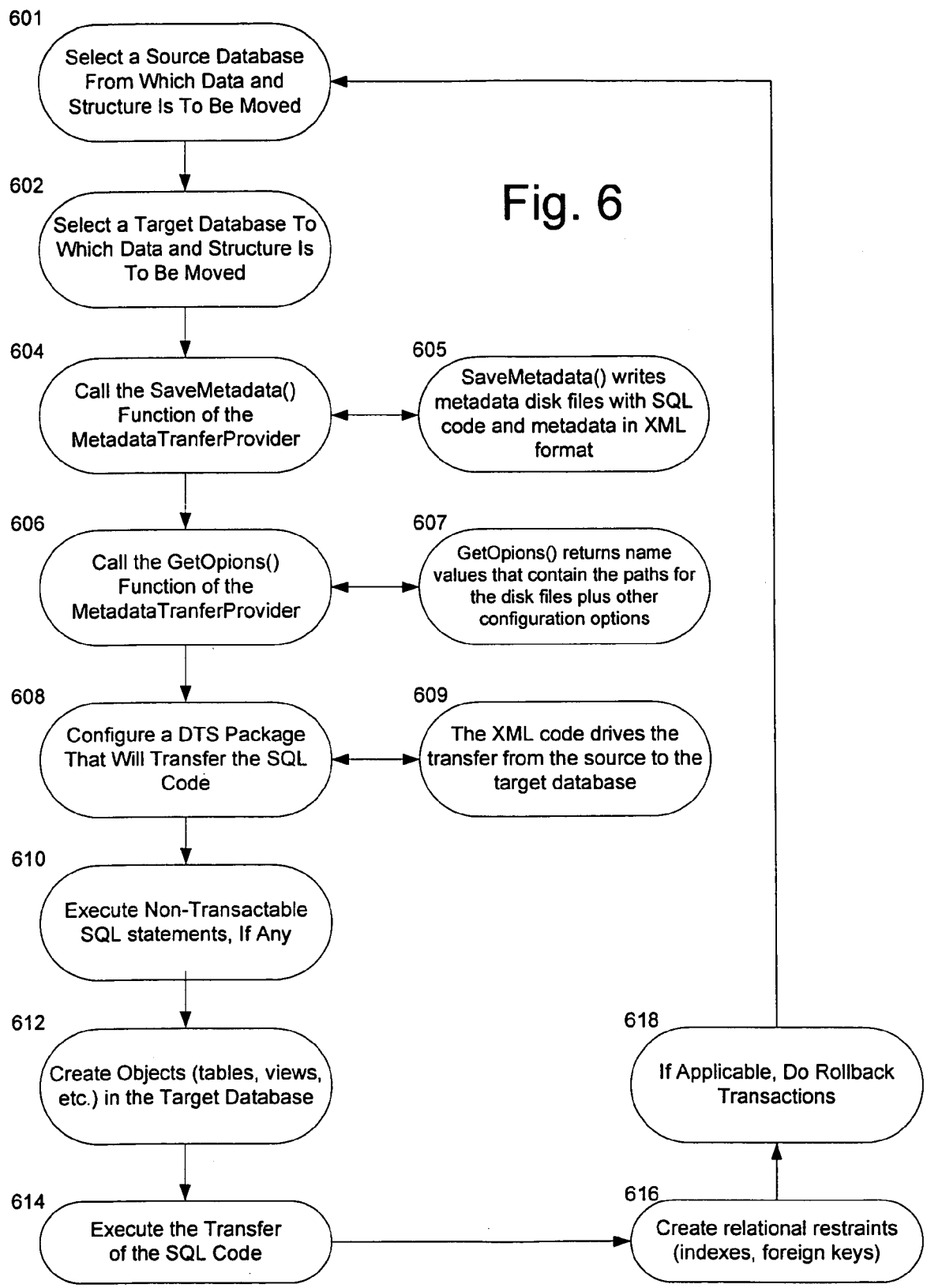

SYSTEM AND METHOD FOR TRANSFERRING DATA AND METADATA BETWEEN RELATIONAL DATABASES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice shall apply to this document: Copyright© 2004, Microsoft Corp.

FIELD OF THE INVENTION

The present invention relates to generic transferring of information between databases, and more particularly, to a script driven infrastructure for selectively moving structure and data from one relational database to another relational database.

BACKGROUND

Structure and data (together hereafter referred to as "information") can be moved between relational databases using an infrastructure such as Data Transformation Services (DTS) in the Microsoft® SQL Server™. An improved way to move such information is to take advantage of XML (eXtensible Markup Language) by applying it to the DTS, such that a script file in XML format is able to drive the transfer process of the DTS, allowing for selective transfer of information stored in SQL format in a database. The XML driven process allows for the selective moving of information because the script file in XML format is based on the structure of the information to be transferred. With this general background, the following sections provide brief background of DTS, XML, and SQL.

DTS

Most organizations have multiple formats and locations in which data is stored. To support decision-making, improve system performance, or upgrade existing systems, data often must be moved from one data storage location to another. One way to move data is by using DTS in the Microsoft® SQL Server™.

DTS is a set of tools that can be used to import, export, and transform heterogeneous data between one or more data sources, such as Microsoft SQL Server, Microsoft Excel, or Microsoft Access. Connectivity is provided through Object-Linking-and-Embedding Data Base (OLE DB), an open-standard for data access. Open Database Connectivity (ODBC) data sources are supported through the OLE DB Provider for ODBC.

A DTS solution is created as one or more packages. Each package may contain an organized set of tasks that define work to be performed, transformations on data and objects, workflow constraints that define task execution, and connections to data sources and destinations. DTS packages also provide services, such as logging package execution details, controlling transactions, and handling global variables. Using a DTS object model, packages can be created and run programmatically and custom tasks and custom transformations can be built.

A DTS package usually includes one or more tasks. Each task defines a work item that may be performed during package execution. For example, tasks can be used to: (1) move data between a source and a destination and to optionally apply column-level transformations to the data, (2) quickly load large amounts of data into a SQL Server table or view, or (3) retrieve values from sources outside a DTS package at package run time and assign those values to selected package properties.

When a group of tasks is defined, there is usually an order in which these tasks should be performed. When tasks have an order, each task becomes a step of a process. For instance, in a DTS Designer tasks are manipulated on the DTS Designer design sheet and use precedence constraints to control the sequence in which the tasks execute. Precedence constraints sequentially link tasks in a package.

The DTS data pump is a DTS object that drives the import, export, and transformation of data. The data pump is used during the execution of the Transform Data, Data Driven Query, and Parallel Data Pump tasks. These tasks work by creating rowsets on the source and destination connections, then creating an instance of the data pump to move rows between the source and destination. Transformations occur on each row as the row is copied. After the data pump processes the last row of data, the task is finished and the data pump operation terminates.

SQL

In the simplest terms, SQL is a language used by relational databases to query, update, and manage data. To work with data in a database, a set of commands and statements (language) defined by the DBMS (database management system) software must be used. Several different languages can be used with relational databases, but SQL happens to be the most common. The American National Standards Institute (ANSI) and the International Standards Organization (ISO) define software standards, including standards for the SQL language.

XML

XML is a World Wide Web Consortium (W3C) endorsed standard for document and data representation that provides a generic syntax to mark up data with human-readable tags. XML does not have a fixed set of tags and thus allows users to define such tags as long as they conform to the XML standard. Data may be stored in XML documents as strings of text that are surrounded by text markup. The W3C has codified XML's abstract data model in a specification called the XML information set (XML Infoset). XML Schemas also may be used to apply a structure to the XML format and content. In the case of an XML Schema, a diagram, plan, or framework for XML data in a document may be defined.

With knowledge of the format, developers can write programs that interact with, massage, and manipulate data in XML documents. Off-the-shelf software like web browsers and text editors can be used to work with XML documents. Some tools are able to work with any XML document. Others are customized to support a particular XML application in a particular domain like vector graphics and may not be of much use outside that domain. But in all cases, the same underlying syntax is used even if the syntax is hidden by more user-friendly tools or restricted to a single application. One unexpected but advantageous development in XML was its enthusiastic adoption of 'data-heavy' structured documents such as spreadsheets, financial statistics, mathematical tables, and software file formats.

Although XML is flexible in the elements it allows to be defined, it is strict in many other respects. It provides a grammar for XML documents that regulates placement of tags, where tags appear, which element names are legal, how attributes are attached to elements, and so forth. This grammar is specific enough to allow development of XML parsers that can read and understand any XML document. Documents that satisfy this grammar are said to be 'well formed.' Documents that are not well-formed are not allowed any more than a C program containing a syntax error would be.

The markup in an XML document describes the document's structure. It lets you see which elements are associated with which other elements. In a well-designed XML document, the markup also describes the document's semantics. For instance, the markup can indicate that an element is a date, a person, or a bar code. In well-designed XML applications, the markup says nothing about how the document should be displayed. That is, it does not say that an element is bold, italicized, or a list item. XML is a structural and semantic markup language, not a presentation language. A few XML applications, like XSL Formatting Objects, are designed to describe text presentation. However, these are exceptions to the general rule. Although XSL-FO describes presentation, one would not write an XSL-FO document directly. Instead, one would write a more semantically marked-up XML document, then use an XSL Transformations stylesheet to change the semantic-oriented XML into presentation-oriented XML.

One of the key advantages of XML is that it offers the tantalizing possibility of truly cross-platform, long-term data formats. It has long been the case that a document written by one piece of software on one platform is not necessarily readable on a different platform, by a different program on the same platform, or even by a future or past version of the same software on the same platform. When the document can be read, all the information may not necessarily come across. For example, much of the data from the original moon landings in the late 1960s and early 1970s is now effectively lost. Even if a tape drive were found that read the obsolete tapes, nobody understands the format in which the data is stored.

Conclusion

Thus, it would be desirable to take advantage of these above mentioned properties of XML and combine them with a SQL Server DTS, such that data and structure stored in SQL on a database could be selectively transferred from a source database to a target database. It would be further advantageous to use a script file in XML format to drive the DTS transfer process, where the script file reflects the structure of what is to be transferred.

SUMMARY OF THE INVENTION

A script driven infrastructure is provided in order to selectively move structure and data from a source database to a target database. Structure and data is moved using a data transfer mechanism, where the structure and data is stored in the source database, and it is selectively moved to the target database. The transfer is driven by script that reflects the structure that is to be transferred. In other words, structure is transferred and it also drives the transfer process of the corresponding data. This setup allows for selective movement of structure and data.

In one aspect of the invention, the transfer mechanism is a DTS (Data Transformation Services) in the Microsoft® SQL Server™. First, the DTS executes a task that creates structure in the target database package. Next, the DTS contains a foreach loop, where the foreach loop includes a custom task that executes a package containing a data pump, where the data pump transfers data from the source database to the target database. A script file in XML format can drive the transfer process because it is based on the structure that was selected to be transferred. Specifically, the foreach loop iterates over the script file, as data corresponding to the structure is pumped to the target database. Once all data has been pumped, a task executes statements that create relational constraints in the target database.

BRIEF DESCRIPTION OF THE DRAWINGS

The foregoing summary, as well as the following detailed description of the invention, is better understood when read in conjunction with the appended drawings. In order to illustrate the invention, exemplary embodiments are shown depicting various aspects of the invention. However, the invention is not limited to the specific systems and methods disclosed. The following figures are included:

FIG. 5 represents aspects of the invention in the form of interface implementations; and FIG. 6 lays out a sample exemplary aspect of the invention.

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Exemplary Computing Environment

Figure 1A:
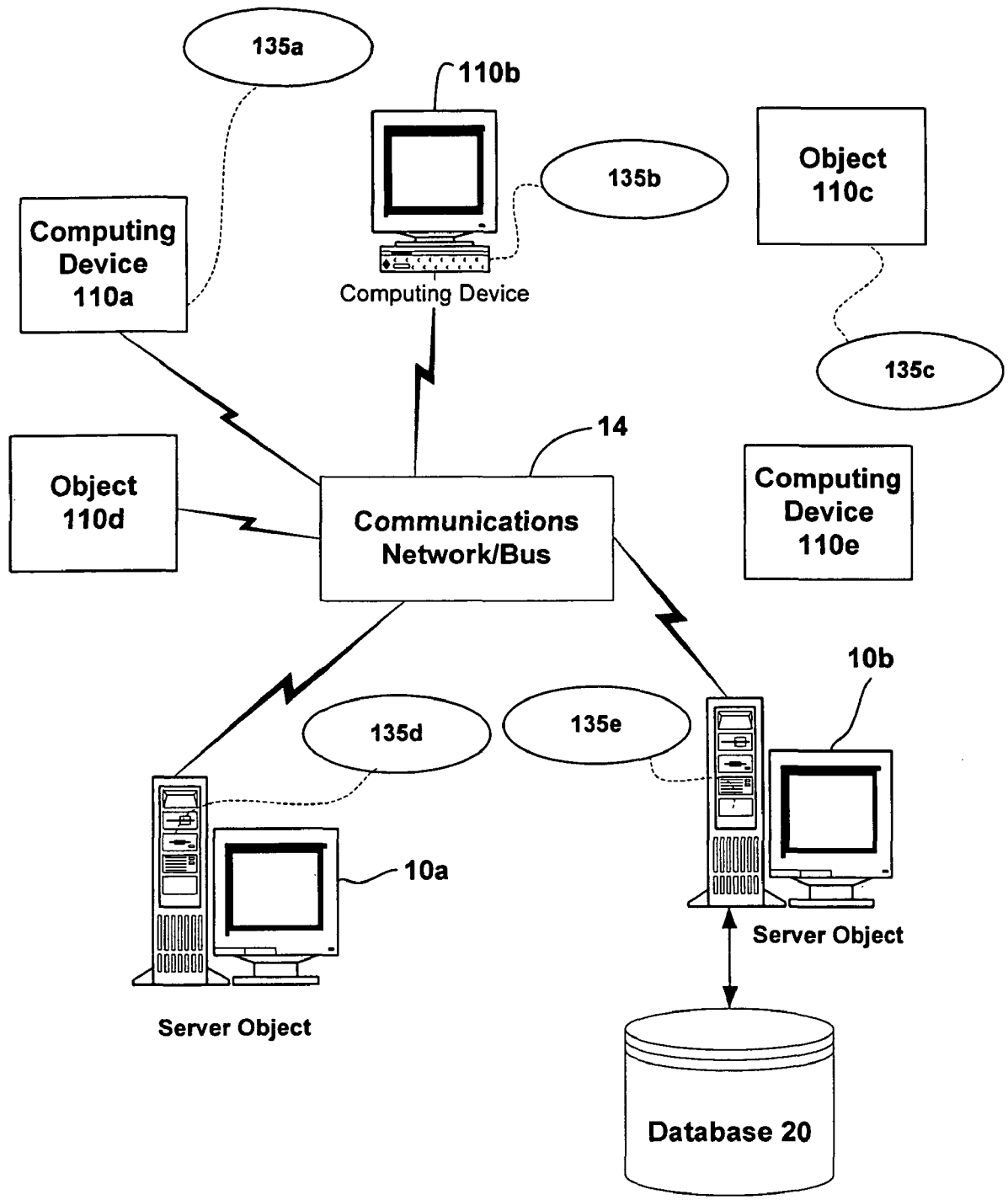
FIG. 1A provides a schematic diagram of an exemplary networked or distributed computing environment.

FIG. 1A provides a schematic diagram of an exemplary networked or distributed computing environment 100a. The distributed computing environment 100a comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 1A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1A computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 1A illustrates an exemplary networked or distributed environment 100a, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment 100a in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment 100a.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment 110a having client computers 110a, 110b, etc. that can access and interact with a computer network/bus 14 and server computers 10a, 10b, etc. that may interact with client computers 110a, 110b, etc. and other like devices, and databases 20.

Figure 1B:
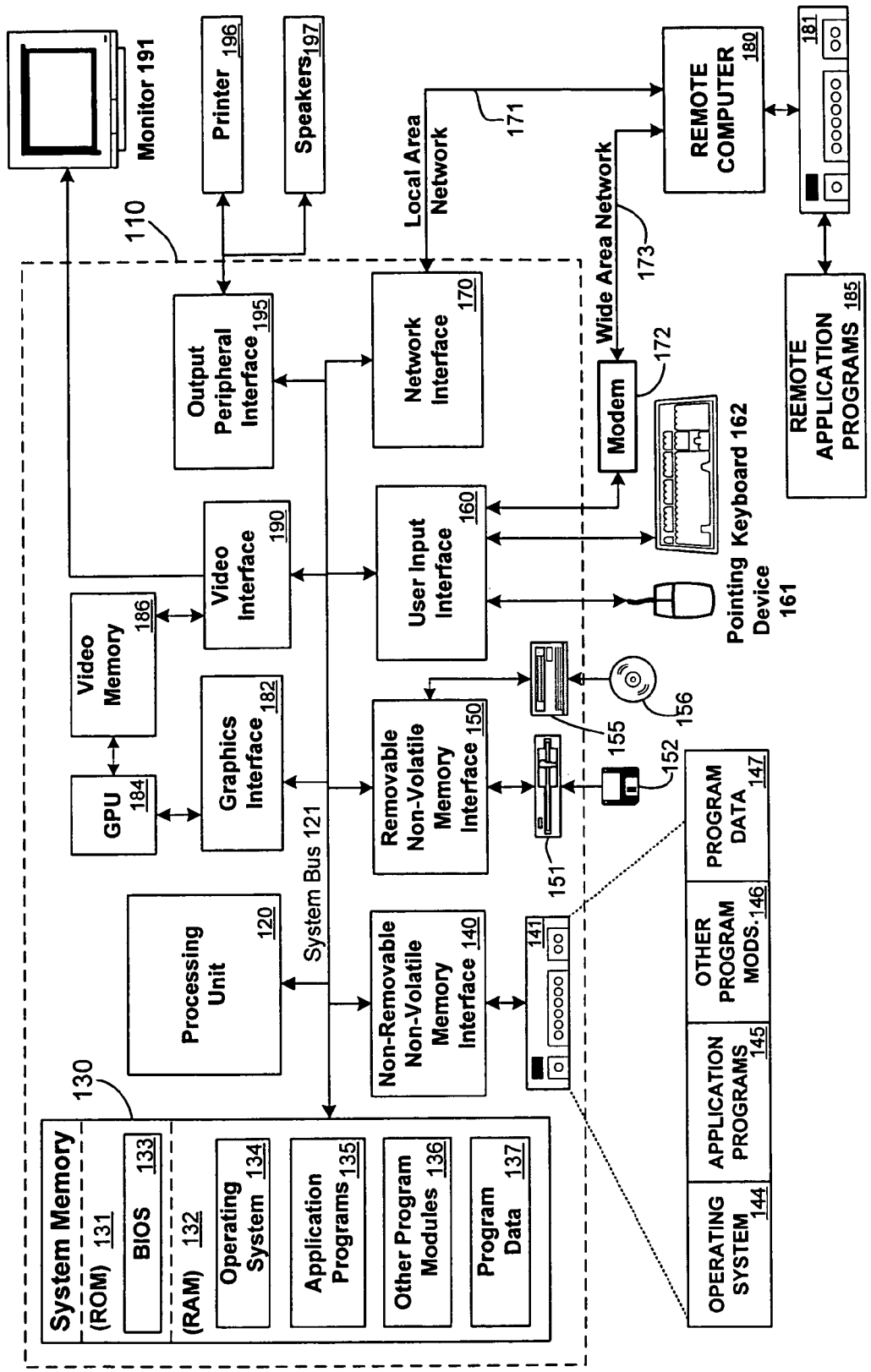
FIG. 1B provides a brief general description of a suitable computing device in connection with which the invention may be implemented.

FIG. 1B and the following discussion are intended to provide a brief general description of a suitable computing device in connection with which the invention may be implemented. For example, any of the client and server computers or devices illustrated in FIG. 1B may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1B thus illustrates an example of a suitable computing system environment 100b in which the invention may be implemented, although as made clear above, the computing system environment 100b is only one example of a suitable computing environment and is not intended to suggest any limitation as to the scope of use or functionality of the invention. Neither should the computing environment 100b be interpreted as having any dependency or requirement relating to any one or combination of components illustrated in the exemplary operating environment 100b.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Script Driven DTS

Figure 2A:
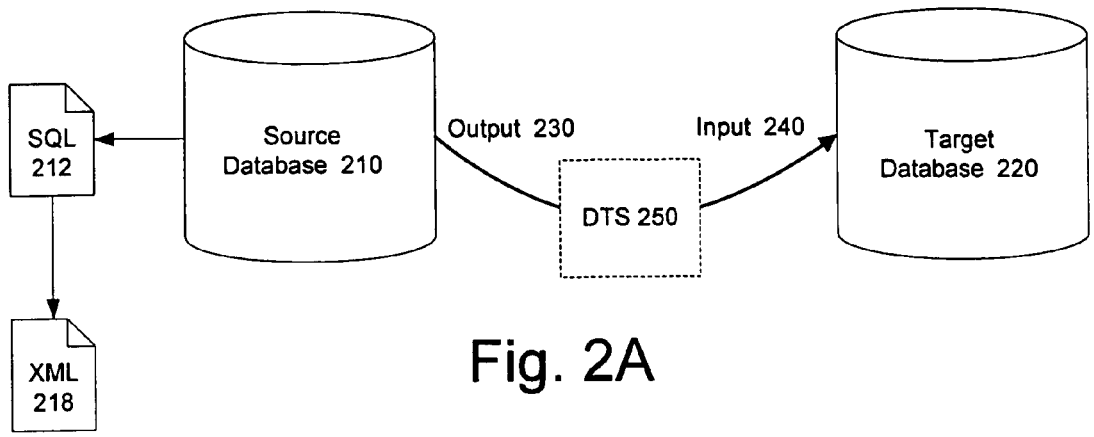
FIG. 2A illustrates the data transfer process using a typical DTS device.

FIG. 2A illustrates one aspect of the present invention. The data transfer process 200a entails the transfer of structure and data from a source database 210 to a target database 220, such that the output 230 from the source database 210 is the input 240 to the target database 220, with the DTS system 250 actually performing the transfer.

In the transferring process 200a, the source database 210 stores SQL files 212, and XML files 218 that reflect the structure of the SQL files 212, where the SQL files 212, among other things, contain table structure and data, and are capable of generating tables in the target database 220. The XML files 218 drive the DTS transfer process 200 via the DTS system 250. It should also be noted that the DTS system 250 does not have to reside independently from either database, but is illustrated so for the benefit of showing in the next figure, FIG. 2B, how it fits in with the functionality of the present invention.

Figure 2B:
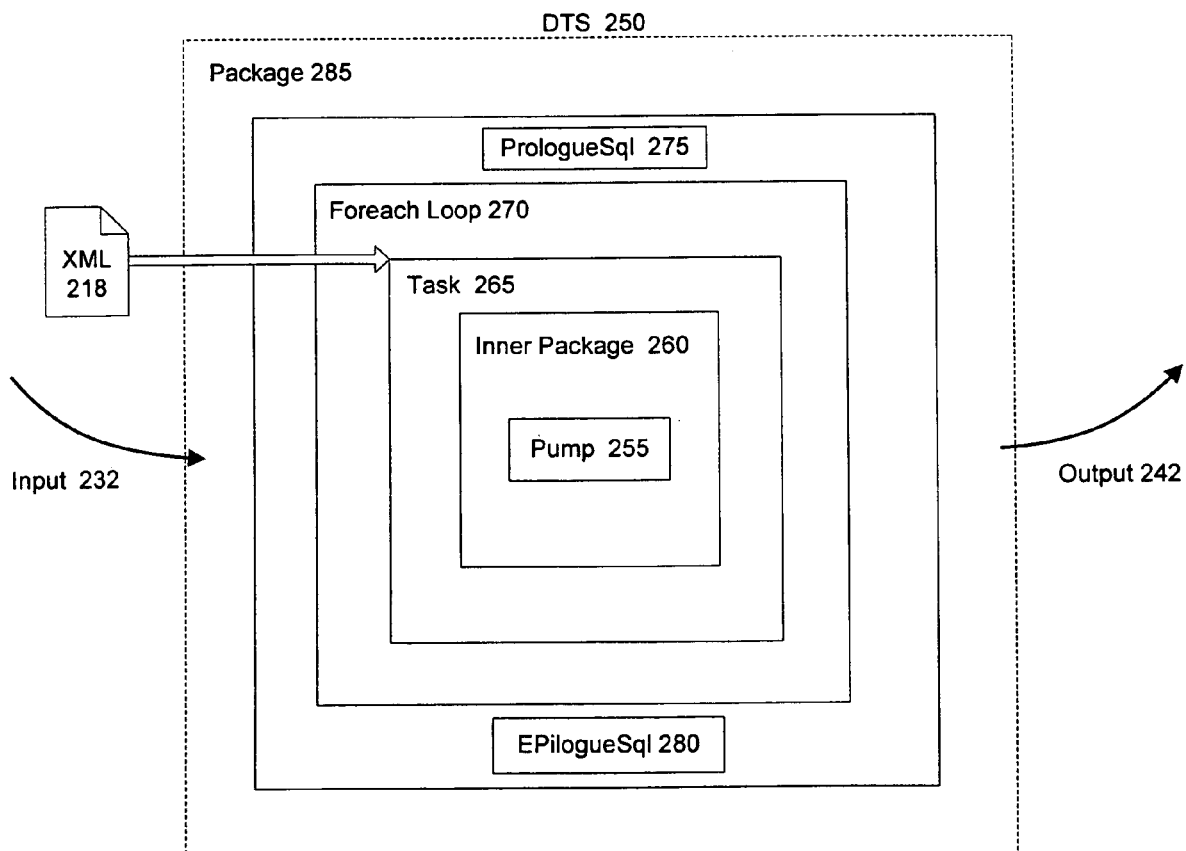
FIG. 2B illustrates a DTS package in full detail and how an script file in XML format is used in conjunction with the package.

FIG. 2B illustrates the general transfer process 200a depicted in FIG. 2A in more detail, focusing on the DTS 200b. It illustrates the typical DTS system 250 that may be applied to an aspect of the present invention in order to transfer information from one database to another database. This DTS system 250 in FIG. 2B corresponds to the DTS system 250 in FIG. 2A, except in FIG. 2B it is shown in much greater detail. Thus, the output 230 from the source database 210 is the input 232 to the DTS package 285 (and ultimately to the task 265), and the output 242 from the package 285 is the input 240 to the target database 220.

The DTS 250 is a wrapper that relies on a DTS package 285. By using a metadata transfer provider (depicted in FIG. 5) to set up a metadata (structure) file, such as the XML file 218 shown in FIGS. 2A and 2B, it can use the metadata to load and execute the DTS package 285. However, it should be noted that altogether other data transfer mechanisms can be used. Conversely, the package 285 itself can be customized with little effort to allow transfer to various OLE databases or towards flat files.

The basic construction element of the inner package 260 is a data pump 255 that transfers the data contained in a typical table. Due to the particularities of the inner package 260 architecture, it is not possible to build an iterative loop that can pass parameters to the pump 255, so the chosen solution is to have a custom task 265 that builds an inner package 260 that contains one data pump 255. The custom task 265 is placed in a foreach loop 270, and is fed with metadata from the XML file 218 that contains instructions about what tables to transfer and their corresponding structure. For example, the following code may be used in the XML file 218:

```
<Table>
    <Name>Department</Name>
    <Schema>HumanResources</Schema>
    <DestSchema>HumanResources</DestSchema>
    <DestName>Department</DestName>
    <Columns>
        <Column>
            <Name>DepartmentID</Name>
            <DestName>DepartmentID</DestName>
            <DataType>smallint</DataType>
        </Column>
        <Column>
            <Name>Name</Name>
            <DestName>Name</DestName>
            <DataType>nvarchar</DataType>
            <Length>50<Length>
        </Column>
        <Column>
            <Name>GroupName</Name>
            <DestName>GroupName</DestName>
            <DataType>nvarchar</DataType>
            <Length>50<Length>
        </Column>
        <Column>
            <Name>ModifiedDate</Name>
            <DataType>datetime</DataType>
    </Columns>
    <ClusteredIndexColumns>
        <Column>
            <Name>DepartmentID</Name>
        </Column>
    </ClusteredIndexColumns>
</Table>
```

In regard to the foreach loop 270, it is a DTS construct that can iterate over the result of an operation. In one aspect of the invention, the operation is a xpath query executed against the configuration XML file 218 (as seen above) that is supplied as a parameter. The query returns the table information in that XML file 218, so in effect there is an iteration over the tables that need to be transferred.

The transfer process of structure and data is started with a PrologueSql component 275 and stopped with an EpilogueSql component 280. The PrologueSql component 275 is a task that creates a data structure in the target database 220 and the EpilogueSql component 280 is a task that executes statements that create constraints and indexes on the transferred data.

For example, with respect to the XML file 218 above, the foreach loop 270 starts with the <Table> tag and goes down the file through <Name>Department</Name>, <Schema>HumanResources</Schema>, <DestSchema>HumanResources</DestSchema>, <DestName>Department</DestName>, and so on, until it reaches the end tag </Table>. As the loop proceeds through these tags, it goes over individual columns such as <Column> <Name>DepartmentID</Name> . . . </Column> to selectively transfer columns that need to be transferred without having to transfer data in units of entire tables. Of course, information can be transferred in whatever selected units the XML file specifies.

The XML file 218 drives the transfer process from one database to another database. The transfer process is script driven in that the XML file 218 functions like a list of commands that can be executed automatically without user interaction. The chosen infrastructure for transferring data in this aspect of the invention is the DTS package 250, but other mechanisms can be used.

Figure 3:
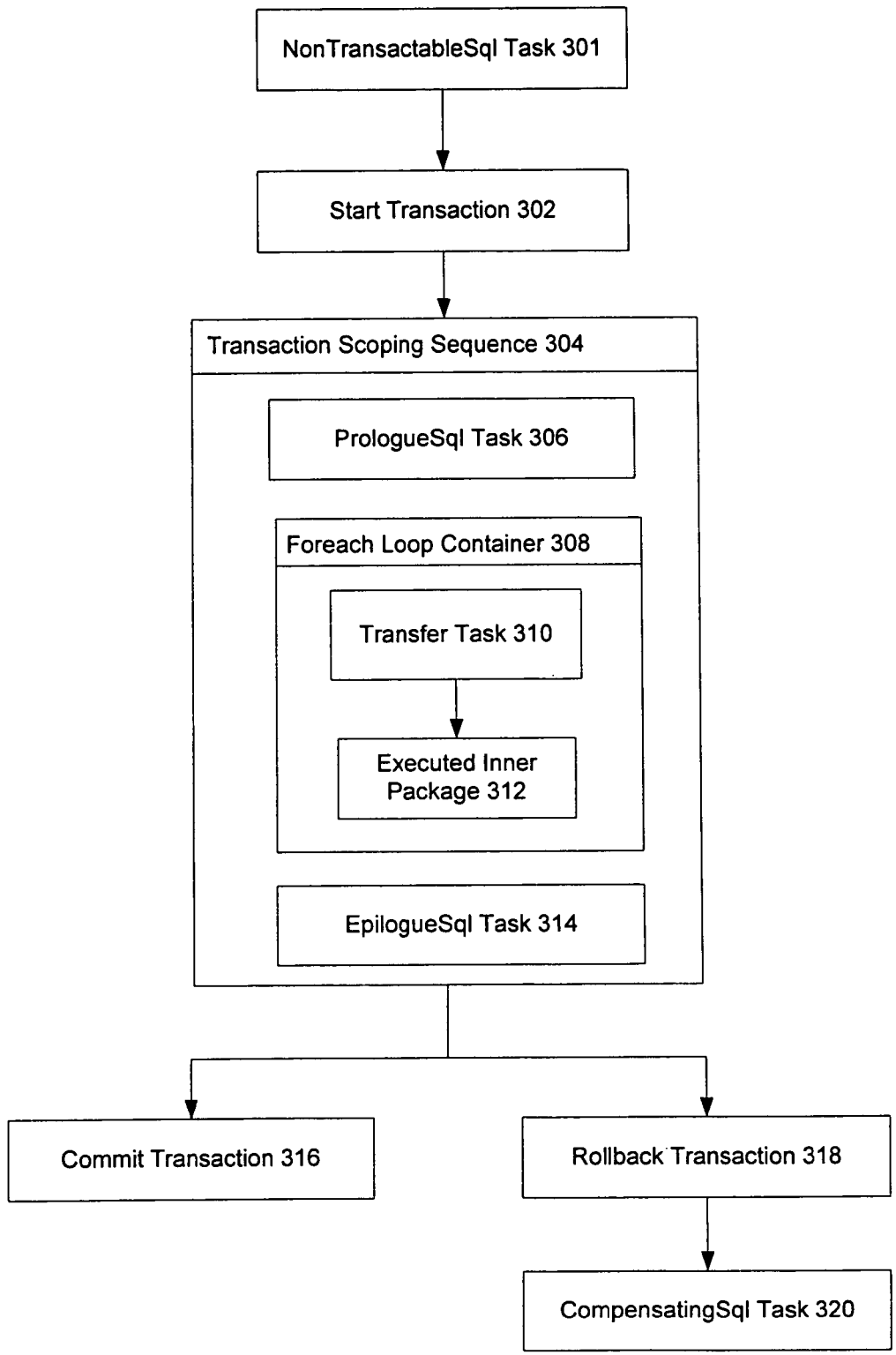
FIG. 3 give a snapshot view of the control flow of a DTS package.

In another aspect of the invention, in FIG. 3 the DTS execution sequence is illustrated. A NonTransactableSql task 301 executes statements that cannot be part of a transaction, such as DLL (dynamic link library) statements. The transfer process starts with a start transaction task 302 that starts database transactions that either get committed or rolled back at the end of the entire operation. Next, a transaction scoping sequence 304 provides a transaction boundary. In the transaction boundary, there is a PrologueSql task 306 that executes statements to create data structures (e.g. CREATE TABLE) in a target database. The PrologueSql task 306 is followed by a foreach loop container 308 that iterates over some script that is fed to a transfer task 310, and the transfer task 310 executes an inner package 312. As mentioned before with reference to FIG. 2B, the inner package 312 contains a data pump that ultimately transfers the data from a source database to a target database. The foreach loop container 308 is followed by an EpilogueSql task 314 that creates relational constraints such as indexes and foreign keys, where the relational constraints are created in the structure and apply to the data.

Additionally, this aspect of the invention also provides a rollback transaction 318 to rollback a transfer to a prior state. Specifically, the CompensatingSql task 320 contains SQL code that is meant to reverse the actions of the first task of a transaction in the event that the transfer process fails or is aborted. In this aspect of the invention, the rollback is complete, but as can be appreciated by persons of ordinary skill in the art, the rollback can be performed to a desired state.

Figure 4A:
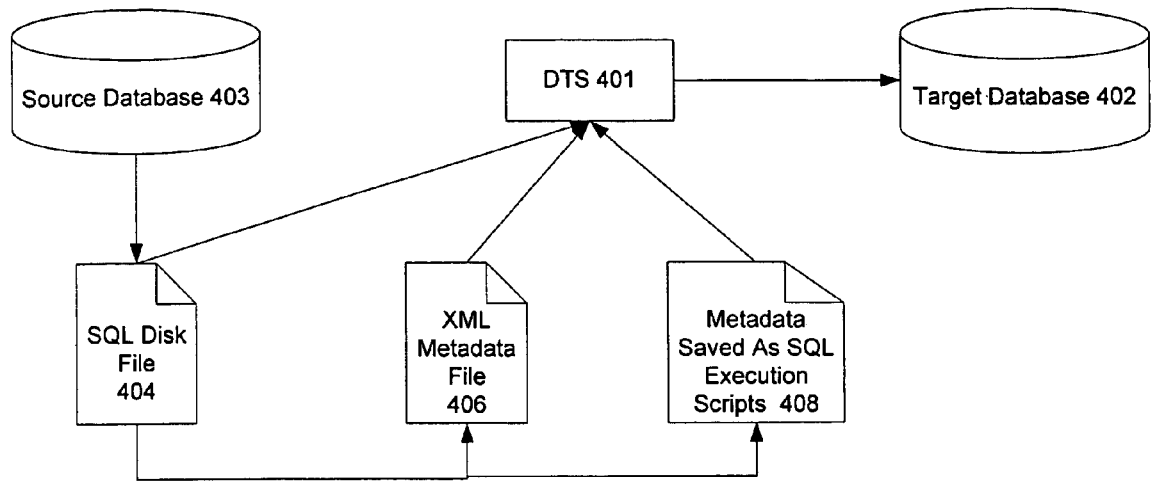
FIG. 4A illustrates the kinds of files that a source database generates and uses in order to transfer structure and data to a target database.
Figure 4B:
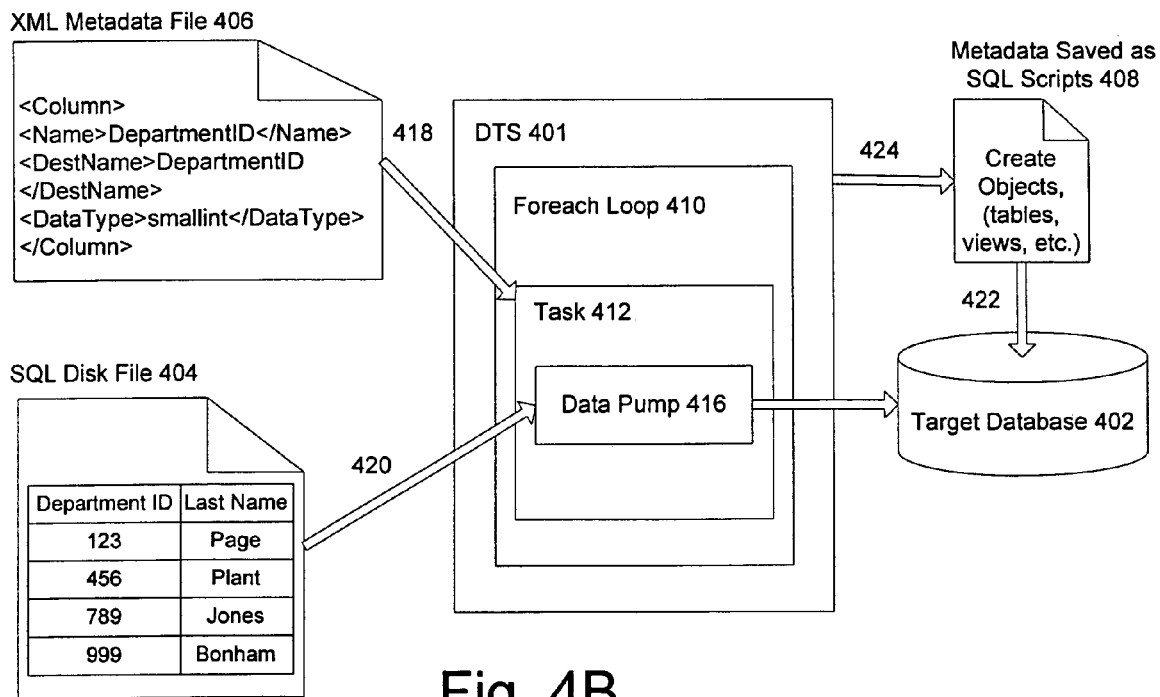
FIG. 4B illustrates in detail the operation of a SQL disk file and a XML Metadata file in a DTS transfer process.

In another aspect of the invention, FIGS. 4A and 4B illustrate the kinds of files that a source database 403 uses in order to transfer data and metadata (structure of data) to a target database 402. In FIG. 4A, the relationships of SQL to XML files is shown in the transfer process 400a. Specifically, in the source database 403, disk files with SQL data 404 are stored. Based on these SQL files, metadata in XML format 406 can be obtained. Part of the metadata 406 is saved as SQL execution scripts 408. These SQL execution scripts 408 create tables, views, indexes, foreign keys, and the like in the target database 402, which means that these execution scripts 408 do not become an input directly into data transfer process, as described in FIGS. 2B and 3, and especially FIG. 4B., where data is transferred using a custom task 412 which executes a package containing a data pump 416.

The other two files, namely, the SQL disk file 404 that contains the actual data to be transferred, and the XML file 406 that contains metadata description of table structure, views, etc. that drives the transfer process, serve as inputs to the task 412 of the DTS. The metadata of the XML file 406 drives the transfer process as the SQL disk file 404 data is being pumped from the source database 403 to the target database 402. It is this process of using SQL execution scripts 408 to instantiate 422 objects in a target database 402 while using the XML file 406 to drive the transfer of SQL disk files 404, that allows this aspect of the invention to selectively move data and structure from one database to another database using some given transfer infrastructure, such as the DTS. It should also be noted that the data discussed above does not have to be stored in files, since data can be moved directly from one database to another database, but in this aspect of the invention files are depicted in order to concretely explain the information transfer process.

FIG. 4B illustrates a more detailed view of the SQL and XML files employed in an aspect of the invention. The XML metadata file 406, containing tags and attributes, drives 418 the foreach loop 410 of the DTS 401 transfer process and provides input to the task 412 as to which data to transfer. For example, the task 412 is able to follow the <column>, <name>, and <DestName> tags in order to transfer the correct data to the target database 402. The data to be transferred is stored in a SQL disk file 404, and it contains all kinds of relational data that is selectively input 420 to a data pump 416 based on the XML metadata file 406 description.

In FIG. 4B, a table is depicted within a SQL disk file 404, containing a Department ID and Last Name attributes with corresponding domain values such as 123 for the first Department ID and the corresponding name of Page under the Last Name attribute. Likewise, the Department ID 456 corresponds to Last Name Plant, and so on. This data contained in SQL disk file 404 can be transferred independently of the transfer of metadata contained in the SQL execution scripts 408. The SQL execution scripts 408 are transferred 424 using the DTS 401 without going through the foreach loop 410. These scripts 408 create objects that will contain subsequently transferred data.

Interface Implementations

In yet another aspect of the invention, exemplary interface implementations of aspects of the invention are shown in FIG. 5. A MetadataTransferProvider 504 implements 508 a ITransferMetadataProvider interface 502 that allows a user to have input in the data transfer process through functions such as: TransferData( ), which transfers relevant data; SaveMetadata( ), which writes metadata disk files with SQL code and metadata in XML format; and GetOptions( ), which retrieves different transfer related configuration options like connection credentials. The GetOptions( ) function can also configure a DTS package.

By way of example, the ITransferMetadataProvider interface 502 may be implemented, on a general level, in the following way:

```
public interface ITransferMetadataProvider
{
    /// Save the metadata in
    void SaveMetadata( );
    /// returns the options as a collection of named variables
```

-continued

```
    SortedList GetOptions( );
}
```

The MetadataTransferProvider 504 also contains the TransferData( ) function, which is the main operation of the data transfer process. The TransferData( ) function starts the entire package execution process. On a general level, it may be implemented in the following way:

```
public void TransferData( )
{
    // use reflection to instantiate the object, and throw if DTS
    not installed
    IDataTransferProvider tp = CreateDtsTransferProvider( );
    tp.Configure(this);
    tp.ExecuteTransfer( );
}
```

Similar to the ITransferMedataProvider interface 502, a IDataTransferProvider interface 501 is implemented, which represents the abstraction 510 of the component that provides data transfer services, namely, the DtsTransferProvider 506. The DtsTransferProvider 506 is a new component that owns a DTS package and can load, configure and execute it. It can be implemented in the following way:

```
public interface IDataTransferProvider
{
    // configure the transfer provider to run with information from the
       metadata provider
    void Configure(ITransferMetadataProvider metadataProvider);
    // executes the transfer operation
    void ExecuteTransfer( );
}
```

Information is transferred between ITransferMetadataProvider 502 and IDataTransferProvider 501 when the DtsTransferProvider 506 calls into the MetadataTransferProvider's 504 function SaveMetadata( ). The MetadataTransferProvider 504 writes metadata disk files with SQL code and metadata in XML format. Next, the DtsTransferProvider 506 calls into GetOptions( ) which returns a pair of name values that contain the paths for files plus other configuration options like connection credentials, and can configure the package with this information. It should be noted that the MetadataTransferProvider 504 is not responsible for temp file management since this is the responsibility of the calling component.

A part of the metadata is saved as SQL execution scripts that create objects and relational constraints. The created objects may be tables, views, and the like, and the relational constraints may be indexes, foreign keys, and the like. These objects and constraints are needed by the DtsTransfer Provider 506 in order to contain the transferred data in the target server.

The DtsTransferProvider 506 takes as inputs the metadata disk files in SQL and the XML description code. In one example, the XML description is table structure, where at minimum, the name of a table is provided and the list of columns with their data type. Optionally, optimization information like the clustered index description is provided, which can speed up insertion time by ordering rows. For scalability purposes, this information is transmitted through text files.

Exemplary Implementation of an Aspect of the Invention

In FIG. 6, in one aspect of the invention, an exemplary implementation is illustrated 600. At step 601, a source database is selected, from which data and structure is to be moved. Although FIG. 6 refers to a database, especially one operating on a SQL Server, applications such as Microsoft Excel, or Microsoft Access could just as easily serve as the source from which data is transferred. The same holds true for the target database. The selection is made by a user at the interface level, using, for example, a SQL Server Manager window.

At step 602, a target database is selected to which data and structure is to be transferred. The target database can comprise of multiple destinations, and if it is only one destination, it can receive data from various sources.

At step 604, the DtsTransferProvider 504, illustrated in FIG. 5, calls the SaveMetadata( ) function of the MetadataTransferProvider 504. As mentioned, the MetadataTransferProvider 504 implements the ITransferMetadataProvider interface 502. As a result of the call, at step 605, the MetadataTransferProvider 504 writes metadata disk files in SQL code and metadata XML files. These data disk files and metadata files provide the structure of what is to be transferred.

At step 606, the DtsTransferProvider 506 calls the GetOptions( ) function. At step 607, this function call returns information regarding the paths for the disk files, but it also provides connection credentials and package configuration information.

At step 608, the DtsTransferProvider 504 can configure a DTS package that will transfer SQL data stored on the disk files encoded in SQL code. Configuration of a package includes defining tasks that allow moving of data between a source and a target destination with applying column level transformation of the data; it can include quickly loading large amounts of data into tables or views by using a bulk insert task; and it can include the writing of code to perform functions that are not available in the other DTS tasks. These are just three of the numerous configuration options.

At step 609, it is explicitly shown that it is the XML code that drives the transfer from the source database to the target database. As explained above, with reference to FIGS. 3B, 4A, and 4B, the XML code provides input to a custom task, and a foreach loop iterates over the XML code until all the tables, views, etc. specified in the XML code are pumped from the source database to the target database.

At step 610, any Non-Transactable SQL statements are executed. These statements include DDL statements and the like, which are not part of the SQL data in a relational database to be transferred. Other examples of non-transactable SQL statements might include creation of a database itself.

At step 612, objects in the target database are created. When the XML metadata is created, part of the metadata is saved as SQL execution scripts. These execution scripts allow for the creation of objects, which are needed by the DtsTransferProvider in order to complete the transfer of the SQL data.

At step 614, the actual transfer of the SQL data is executed and, as step 610 indicates, Non-Transactable SQL statements, such as DLL statements, are executed in sequence with the SQL data. After the creation of objects, and after the transfer of SQL data is executed, at step 616, relational restrains are created that include indexes, foreign keys, and the like.

Lastly, at step 618, the transfer can be rolled back to a previous state. The rollback is accomplished through a CompensatingSql task that contains SQL code that is meant to reverse the action of the first task of a transaction, in the event that the transfer process fails or is aborted.

While the present invention has been described in connection with the preferred aspects, as illustrated in the various figures, it is understood that other similar aspects may be used or modifications and additions may be made to the described aspects for performing the same function of the present invention without deviating there from. For example, while a DTS transfer provider was described, where the transfer provider is driven by XML code, other equivalent transfer providers and driving code may be employed. Therefore, the present invention should not be limited to any single aspect, but rather construed in breadth and scope in accordance with the appended claims.

What is claimed:

1. A computer system, comprising:
a first memory;
a second memory;
a first relational database store storing data as a plurality of table units, each table unit comprising a plurality of columns;
a second relational database store;
wherein said first relational database store resides in said first memory and said second relational database store is resides in said second memory;
a transfer provider executing on a processor for sending selected content and structure of the data from said first relational database store to said second relational database store, wherein the transfer provider is a Data Transformation Services (DTS) provider;
an extensible markup language script code for determining which selected content and structure of the data is sent from said first relational database store to said second relational database store using said transfer provider, wherein the extensible markup language script code is determined based on the relational data stored in the first relational database store; and
a structured query language execution script determined based on the extensible markup language script code and configured to assist to send the selected content and structure of the data from the first relational data store to the second relational database store by creating an object in the second relational database store, wherein the structured query language execution script is determined based on extensible markup language script code that is, in turn, determined based on relational data stored in the first relational database store, and wherein the structured query language execution script is transferred independently of the relational data stored in the first relational database store;
wherein said extensible markup language script code is in a first format and said data is originally arranged in a second format that is different from said first format, wherein said second format is a structured query language format;
wherein said extensible markup language script code uses fields embedded in said first format that correspond to fields embedded in said second structured query language format to drive a task that transfers said data, wherein said fields embedded in said first format comprise a plurality of source name fields and, for each source name field, a destination name field and a data type field describing a data type of a data structure created by the task in the second relational database store;
wherein said extensible markup language script code obviates transfer of data in entire table units by transferring selected content and structure of said data.

2. The computer system according to claim 1, wherein at least one of the first and second relational databases runs on a SQL server.

3. The computer system according to claim 1, wherein the transfer provider is a wrapper that relies on a standard Data Transformation Services (DTS) package.

4. The computer system according to claim 3, wherein the Data Transformation Services (DTS) package contains a loop, and wherein the loop contains a task, wherein the task reads the script code in order to determine which data content to send from the first relational database store to the second relational database store.

5. The computer system according to claim 4, wherein the loop iterates over the results of an xpath query executed against the script code.

6. The computer system according to claim 1, wherein the script code is in XML format.

7. The computer system according to claim 1, wherein the content and structure of data is stored on a disk in the first relational database.

8. The computer system according to claim 1, wherein the content and structure of data is specified via a user interface.

9. A computer-implemented method for managing information in the form of data and structure between storage devices, the computer-implemented method comprising:
selecting a first storage device, wherein the first storage device stores relational data and structure;
selecting a second storage device;
accessing a transfer mechanism for transferring selected data and structure from the first storage device to the second storage device, wherein the transfer mechanism is a wrapper that relies on a Data Transformation Services (DTS) package;
running structural code corresponding to the structure of the information, wherein the structural code determines which data is transferred by the transfer mechanism from the first storage device to the second storage device, and wherein the structural code is determined based on the relational data stored in the first storage device;
storing a portion of the structural code as a structured query language execution script configured to assist to transfer the data from the first storage device to the second storage device by creating an object in the second storage device, wherein the structured query language execution script is determined based on structural code that is, in turn, determined based on the relational data stored in the first storage device; and
transferring the data transferred by the transfer mechanism independently from a transfer of the structured query language execution script;
wherein said structural code is in an extensible markup language format and said data is arranged in a structured query language format that is different from said extensible markup language format, and wherein said structural code uses fields embedded in said extensible markup language format that correspond to fields embedded in said structured query language format to drive the transfer mechanism, wherein said fields embedded in said extensible markup language format comprise a plurality of source name fields and, for each source name field, a destination name field and a data type field describing a data type of a data structure created by the transfer mechanism in the second storage device; and
wherein said structural code obviates transfer of data in entire table units by transferring selected content and structure of said data.

10. The computer-implemented method according to claim 9, wherein the first storage device is a SQL Server relational database.

11. The computer-implemented method according to claim 9, wherein the DTS package comprises a loop, a task, an inner package, and a data pump.

12. The computer-implemented method according to claim 11, wherein the loop iterates over the structural code and the task transfers the selected data using the data pump, from the first storage device to the second storage device.

13. The computer-implemented method according to claim 9, wherein the selected structural code is in XML format and the selected data is in SQL format.

14. A computer-implemented method of transferring data and metadata among relational databases, the computer-implemented method comprising:

selecting a source database and a target database, wherein the source database contains the data and the metadata;

sending selected portions of the data stored in a structured query language format and the metadata formatted in an extensible markup language from the source database to the target database, wherein the metadata determines which portions of the data are sent from the source database to the target database and uses fields that correspond to fields embedded in the structured query language format to drive a task that transfers said data, wherein said fields used by the metadata comprise a plurality of source name fields and, for each source name field, a destination name field and a data type field describing a data type of a data structure created in the target database, wherein the sending is performed by a transferring mechanism comprising a Data Transformation Services (DTS) package;

storing a portion of the metadata as a structured query language execution script that assists to send the selected portions of the data from the source database to the target database by creating an object in the target database, wherein the structured query language execution script is determined based on the metadata formatted in an extensible markup language that is, in turn, determined based on the data stored in the structured query language; and transferring the data stored in the structured query language format independently from a transfer of the structured query language execution script;

wherein said metadata obviates transfer of data in entire table units by transferring only the selected portions of said data.

15. The computer-implemented method according to claim 14, wherein the source database and the target database operate on SQL servers.

16. The computer-implemented method according to claim 14, wherein the metadata is in XML format and the data is in SQL format.

17. The computer-implemented method according to claim 14, wherein the metadata is in SQL format in order to generate objects on the target relational database, wherein the objects include tables and views, and in imposing relational constraints on the selected data, wherein the relational constraints include indexes and foreign keys.

18. The computer-implemented method according to claim 14, wherein the DTS package comprises a foreach loop, wherein the foreach loop comprises a task with a data pump.

19. The computer-implemented method according to claim 18, wherein the foreach loop iterates over the metadata while the corresponding selected data is pumped from the source database to the target database using the data pump.

* * * * *